March 19, 1968 L. PONTHUS ETAL 3,374,360

NON-RESETTABLE COUNTER WITH MEANS FOR CYCLICALLY CHANGING POLARITY OF INPUT PULSES TO PROVIDE CONTINUOUS SCALING

Filed March 4, 1965 3 Sheets-Sheet 1

INVENTORS
JACQUES LACOUR
LOUIS PONTHUS
BY Bacon & Thomas
ATTORNEYS

INVENTORS
JACQUES LACOUR
LOUIS PONTHUS
BY Bacon & Thomas
ATTORNEYS

NON-RESETTABLE COUNTER WITH MEANS FOR CYCLICALLY CHANGING POLARITY OF INPUT PULSES TO PROVIDE CONTINUOUS SCALING

Filed March 4, 1965 3 Sheets-Sheet 3

INVENTORS
JACQUES LACOUR
LOUIS PONTHUS
BY Bacon & Thomas
ATTORNEYS 3,374,360

NON-RESETTABLE COUNTER WITH MEANS FOR CYCLICALLY CHANGING POLARITY OF INPUT PULSES TO PROVIDE CONTINUOUS SCALING

Louis Ponthus, Lyon, and Jacques Lacour, Grenoble, France, assignors to Commissariat à l'Energie Atomique, Paris, France Filed Mar. 4, 1965, Ser. No. 441,404
Claims priority, application France, Mar. 9, 1964, 966,687
8 Claims. (Cl. 307—225)

ABSTRACT OF THE DISCLOSURE

The present invention relates to a device for counting a repetitive series of pulses or a pulse train. Particularly the present invention concerns a counting device including a scaling unit comprised of a plurality of bistable elements arranged so that they may be sequentially switched by a positive pulse train and then by a negative pulse train without having to be reset.

The present invention generally relates to counting devices which make use of scalers consisting of bistable elements and in particular to a device of this type which makes it possible to provide scaling units having a very short dead time.

It is known that devices such as tunnel diodes (as shown in FIG. 1*b* of the accompanying drawings) have characteristics $I=f(V)$ having the shape of an N (as shown in FIG. 1*a*). These devices, which usually have two stable operating points corresponding to the first and to the third leg of the N, the slopes of which are positive, constitute bistable elements (as shown in FIG. 1*b*) such as tunnel diodes (as shown in FIG. 1*c*) and serve to form scaling units. It should be noted that the stable state corresponding to an operating point located on the third leg of the N will hereinafter be considered as representing the number "1," whereas the stable state corresponding to the operating point located on the first leg of the N will hereinafter be considered as representing "0." The scaling units consist of a plurality of similar cells each comprising one bistable element. When the operating state of each bistable element or multivibrator represents "0," for example, the application of a number of pulses of suitable polarity initiates the establishment of the second stable state within a corresponding number of bistable elements.

In the case of a parallel-connected scaling unit, for example, the pulses having the same polarity drive via resistors all of the bistable elements which have a separate polarity, each of said pulses trips the only bistable element which has been sensitized by the bistable element which previously tripped. When all of the bistable elements have tripped, it is essential to restore the scaling unit to its initial state by means of a zero-resetting before continuing to count the incident pulses. The need to carry out this operation at the end of the counting cycle introduces a considerable loss of time which is liable to result in a dead time of several tens of nsecs whereas the resolving time from one bistable element to the other (case of a tunnel diode) is only 2 nsecs.

Series-connected scaling units give rise to disadvantages of the same kind. The pulses of predetermined polarity drive the bistable elements which are associated in cascade and fed in series. The final incident pulse trips the bistable element which has the lowest peak current. Finally, when all of the multivibrators have operated, it still remains essential to carry out the zero resetting which introduces as before a substantial dead time.

The device according to this invention has for its object to overcome the major drawback which has been noted above since the need to reset to zero is dispensed with, thereby making it possible to reduce to a considerable extent the dead times of the scaling units which are associated therewith.

The device is characterized in that the establishment of one of the stable state as well as the establishment of the other stable state in the last bistable element of the scaling unit initiates a reversal of polarity of the pulses which are applied to said scaling unit.

In accordance with a preferred form of embodiment, a counting device of the type hereinabove defined is characterized in that it comprises, in addition to a scaling unit, a tripping device which is coupled to said scaling unit, and further characterized in that said tripping device controls a shaping device which receives the pulses to be counted and produces corresponding pulses which are applied to said scaling unit by said shaping device which controls the polarity of said corresponding pulses according to the orders of said tripping device.

According to a form of embodiment which can readily be carried into practice, each bistable element which forms part of the scaling unit is a tunnel diode.

In accordance with a preferred alternative form of the invention, each bistable element of the scaling unit is constituted by the parallel assembly of a tunnel diode in series with a polarizing voltage source and a second tunnel diode identical with the first in series with a second polarizing voltage source which is also identical with the first, the two tunnel diodes as well as the two voltages sources being mounted in opposite directions.

The shaping device consists of an input transformer in which the mid-point of the secondary winding is coupled to a polarizing voltage source whilst the two extremities of said winding are respectively coupled through the intermediary of identical resistors to the anode and to the cathode of two tunnel diodes which are also identical, the cathode of the first diode and the anode of the second diode being coupled to the scaling unit.

The tripping device consists of a transistor and even in certain cases can be reduced to a simple resistor, the shaping device being in that case coupled to the scaling unit through the intermediary of a phase-reversing transformer.

Aside from these main arrangements, the invention comprises a certain number of secondary arrangements which will be mentioned hereinafter, particularly in regard to the operation of the shaping device as well as the different forms of embodiment of the invention which comprises three scaling units, the control circuits of which are respectively of the parallel type, series type and series-parallel type.

In order that the characteristic features of this invention may be more readily understood, there will now be described a number of forms of embodiment thereof, it being understood that said forms of embodiment are not given in any limiting sense either in regard to the modes of execution of the invention or in regard to the uses to which it may be applied.

In the accompanying drawings:

FIGS. 1*b* and 1*c* show alternative symbolic forms for the tunnel diode element employed in the invention, while FIG. 1*a* shows the negative resistance characteristic therefor.

Figure 2:
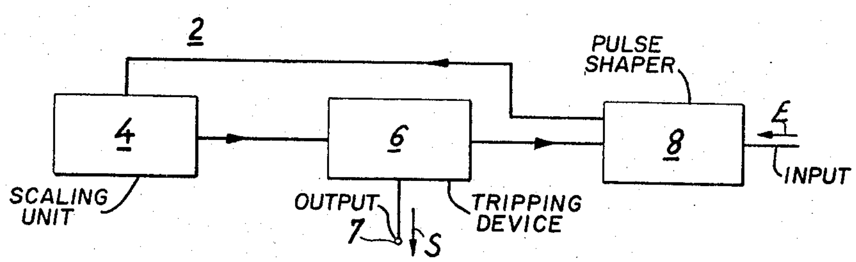
FIG. 2 is a block diagram of a scaling unit in accordance with the invention.
Figure 5A:
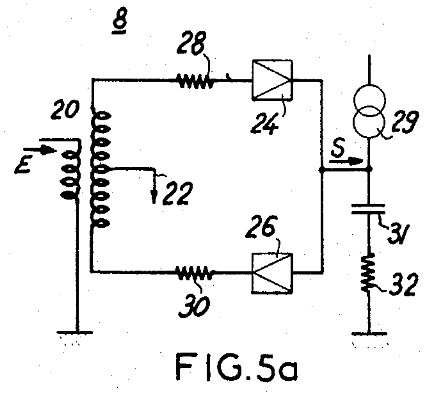
Figure 5B:
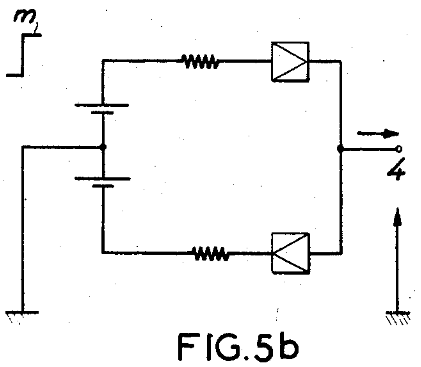

FIGS. 5*a* and 5*b* illustrate a form of embodiment of the shaping unit of a counting device such that which is shown in FIG. 2.

Figure 6:
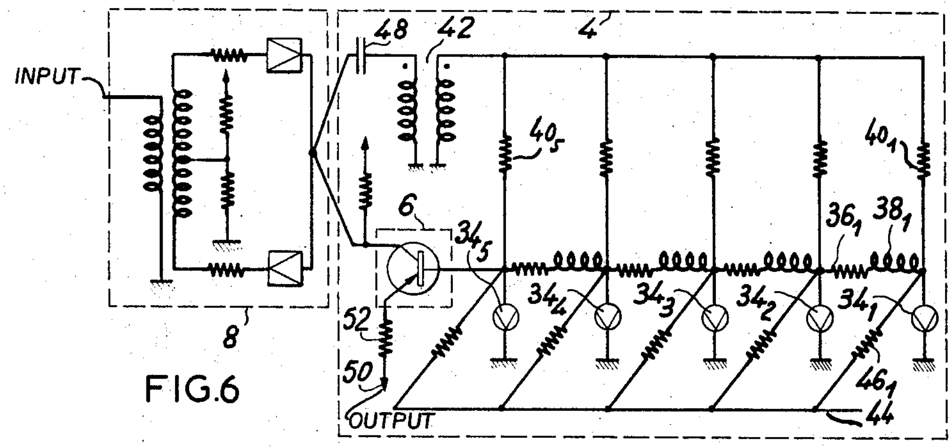
Figure 7:
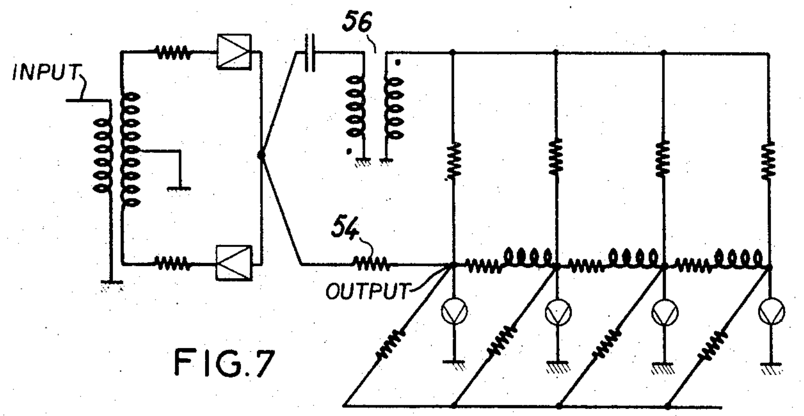

FIGS. 6 and 7 are circuit diagrams of two parallel-connected scaling units.

Figure 8:
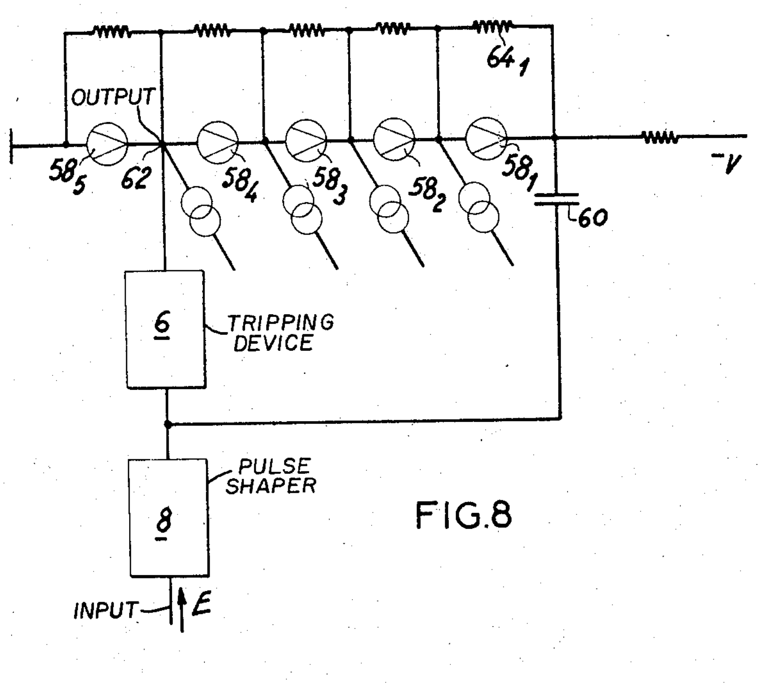
Figure 9:
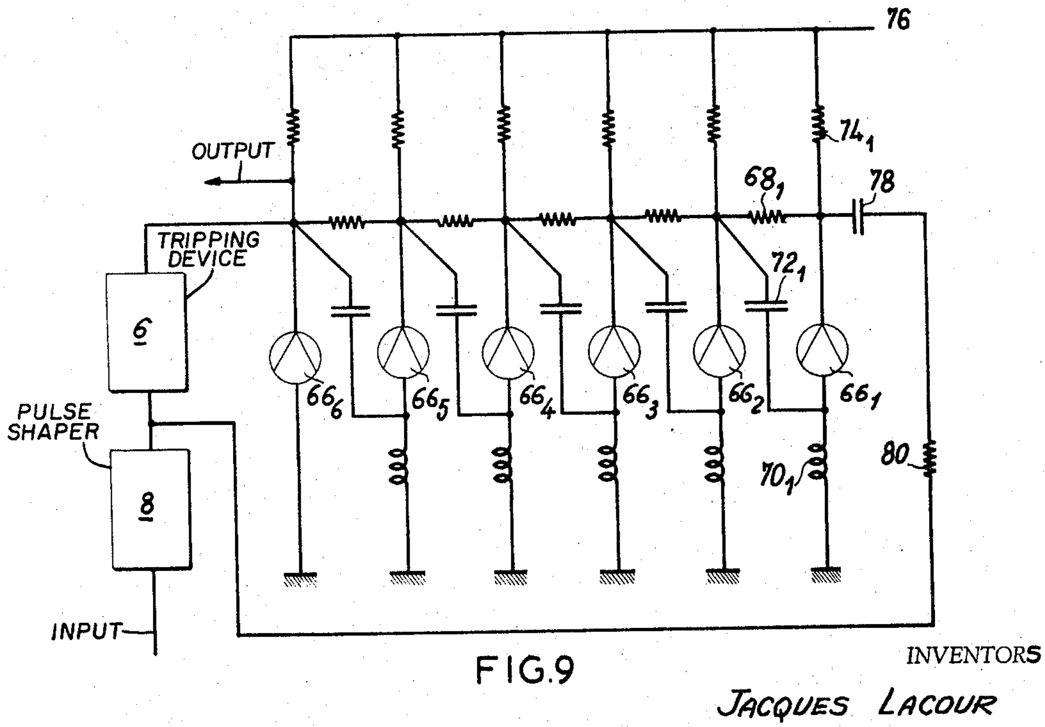

FIGS. 8 and 9 illustrate two other forms of embodiment of the invention which relate to scaling units which are connected respectively in series and in series-parallel.

Aa counting device 2 for the practical application of the method according to the invention is shown in FIG. 2. Said device comprises a scaling unit 4, the last stage of which is coupled with a tripping device 6 which controls a unit 8 for shaping the pulses to be counted, said shaping unit being adapted to control the polarity of the pulses according to the orders of the tripping device. It should be noted that an effective signal for counting pulses can be collected at one of the terminals 7 of the change-over unit or tripping device.

Figure 3:
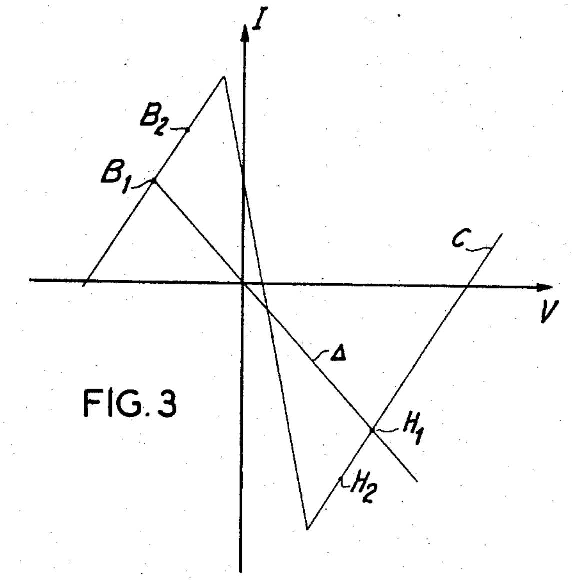
FIG. 3 is a graph which serves to explain the operation of a scaling unit in accordance with the invention.

The operation of the counting device of FIG. 2 will now be briefly described. The bistable elements of the scaling unit 4 (point $B_1$ or $B_2$) on the characteristic $I=f(V)$ of a bistable element reproduced in the graph of FIG. 3 on which has been drawn the load line Δ of a bistable element) will be assumed to have in all cases the same stable state, namely the state "0," the transmission by the shaping unit 8 of a pulse of suitable polarity initiates the tripping or change-over of the first bistable element to the state "1" (point $H_1$ or $H_2$, in this case $H_2$) the second bistable element being accordingly sensitized and its operating point moves from $B_1$ to $B_2$. A second pulse to be counted initiates the change-over of said second bistable element (point $H_2$) which sensitizes the third bistable element in its turn. The said third bistable element changes over from state $B_1$ to state $B_2$ whilst the first bistable element changes over from $H_2$ to $H_1$. The same process is repeated each time a pulse to be counted is transmitted by the unit 8 until all of the bistable elements have achieved the stable state "1."

The tripping device 6 then produces a signal which initiates the reversal of polarity of the pulses which appear at the output of the shaping unit 8, the arrival of new incident pulses again initiates the tripping of the bistable elements which are restored to their initial state, the order of tripping of the bistable elements being always the same, the state of operation of the bistable element of order 1 being again modified first when all of the bistable elements have left the initial state and when a new incident pulse is applied.

Figures 1A, 1B, 1C, 4:
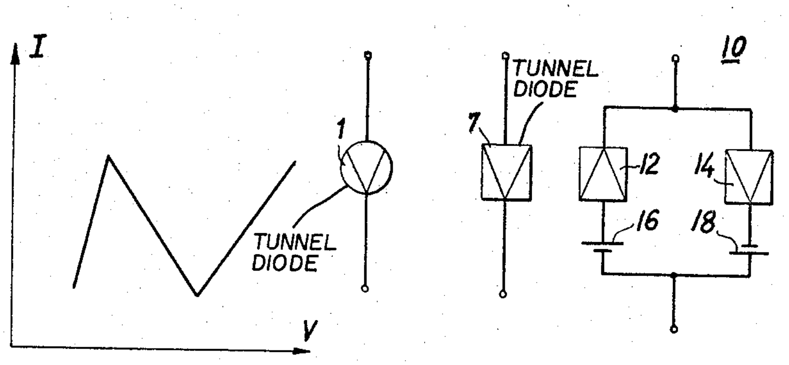
FIG. 4 illustrates a type of bistable element which can be employed in accordance with a preferred form of embodiment of the present invention.

It has already been explained that, according to the invention, the bistable elements can be tunnel diodes (as designated by the reference 7 in FIG. 1*c*). However, when it is desired to ensure extremely accurately operation, it will be found preferable to make use of bistable elements 10 which are constituted by two tunnel diodes 12–14 (as shown in FIG. 4). It should be specified that said element 10 is constituted by the parallel assembly of a tunnel diode 12 which is connected in series with a polarizing voltage source 16 and a second tunnel diode 14 which is identical with the first in series with a second voltage source 18 which is also identical with the first. It will be noted that, in the two branches of this parallel assembly, the two elements are arranged in the same order although the polarity of each of said elements is reversed. It should be noted that a device of this type is usually designated by the term "goto-pair."

FIG. 5*a* represents a shaping unit 8 which receives the pulses to be counted at E and transmits the corresponding pulses to the scaler 4, the polarity of said pulses being controlled by the tripping device 6. The input device which receives the incident pulses is a transformer 20, wherein one extremity of the primary winding is brought to a reference potential and the midpoint of the secondary winding is connected to the terminal 22 of a polarizing voltage source (not shown) whilst the ends of said secondary winding are respectively connected to the two tunnel diodes 24–26 via resistors 28–30.

One end of the secondary winding of the input transformer is connected to the anode of one of the tunnel diodes whilst the other end is connected to the cathode of the second tunnel diode, the cathode of the first tunnel diode and the anode of the second tunnel diode are coupled to the scaling unit which has been replaced in this case by an equivalent circuit consisting of the current source 29, the capacitor 31 and the resistor 32.

The arrangement which has just been described can be simplified in accordance with FIG. 5*b* for the purpose of studying the behavior of the input element when a positive step $m$ is applied to the primary winding of the transformer 22.

The characteristic of this element can be obtained by the association of the caracteristics of the two diodes 24–26, $I=f(V)$ of N shape, these two curves being then symmetrical with respect to the origin. It is relatively easy to show that the amplitude of the pulses applied to the input element must be comprised between two values which are a function of the diode characteristics.

There now follows a description of a counting device wherein the scaling unit is characterized by a parallel coupling of the bistable elements (the scaler which is represented in the drawings has five elements $34_1$, $34_2$, $34_3$, $34_4$, $34_5$), the cathodes of which are connected to ground (earth) whilst the anodes of two adjacent bistable elements of the order $n-1$ and $n$ are coupled by the series-connected assembly of a resistor $r_n-1$ ($36_1$ to $36_4$) and an inductance $i_n-1$ ($38_1$ to $38_4$), the intended function of said inductances being to regulate the delay of transmission in each cell. The anodes of the bistable elements are coupled through resistors ($40_1$ to . . .) to the secondary winding of a coupling transformer 42. It should be noted that the values of the resistors corresponding to the bistable elements of the order 2 to $(N-1)$ are identical and so determined as to sensitize, at the time of tripping, the bistable element to which said resistors are couped. The value of the resistance of the first stage is so determined as to sensitize the first bistable element when the last element has tripped. The value of the resistance corresponding to the last bistable element is determined in such manner that, when said bistable element trips, a reversal of polarity of the pulses produced by the input element is initiated through the intermediary of the change-over device 6. Finally, the anodes of these bistable elements are also coupled through resistors ($46_1$ to $46_5$) to the negative pole (44) of a polarizing source (which has not been shown in the drawings).

The output circuit of the input element is coupled to the primary winding of the coupling transformer 42 through a capacitor 48, said output circuit is also coupled to the collector of the transistor which constitutes the change-over unit 6 and the base of which is connected to the anode of the last bistable element, whilst the emitter is coupled via a resistor 52 to the positive pole 50 of a second polarizing voltage source which has not been shown in the drawings. It will be noted that the signal which appears at the emitter of the transistor can serve for the purpose of counting the number $n$ of reversals of polarity which are brought about by the unit 6, that is to say the number $5n$ of pulses received.

In certain cases, it is possible to simplify the design of the change-over unit (as shown in FIG. 7), which is then reduced to a simple resistor 54; the transformer 56 which provides a connection between the input element and the scaling unit must play the part of a phase changer when it is desired to reduce to the maximum the power required for the tripping of the bistable elements.

It is found preferable to employ a series-connected scaling unit (as shown in FIG. 8) when it is desired to ensure that the tripping power is of low value. It will be observed that the counting devices of FIGS. 2 and 8 comprise similar elements which are designated by the same reference numerals. In this case, the bistable elements ($58_1$ to $58_5$) are driven via a capacitor 60 which is mounted at one end of the cascade of bistable elements, the output of the input element 8 is coupled to the terminal 62 of the counting device via the tripping device 6. One of the bistable elements connects said terminal to ground (earth). For the decoding operation, it is necessary to ensure that the bistable elements always trip in the order ($58_1$ to $58_5$). As a consequence, it is necessary to ensure that the peak currents of these diodes increase in the same direction as the order of the bistable elements whilst the minimum current values decreases. This result can be obtained by associating resistors ($64_1$ to $64_5$) in parallel with said bistable elements and by feeding currents produced by auxiliary sources to the cathodes of the different bistable elements.

Finally, it is possible to combine to a certain extent the advantages of the counting device having a series-connected scaling unit with those of counting devices having a parallel-connected scaling unit by employing the compound circuit arrangement which illustrated in FIG. 9. The cathodes of two sucessive bistable elements ($66_1$ to $66_5$) are coupled together via resistors ($68_1$ to . . .) whilst the anodes are all coupled (except for the anode of the last bistable element $66_6$) to a point which is brought to a reference potential by an inductance ($70_1$ to . . .), the anode of the last bistable element ($66_6$) is directly connected to ground (earth). The anode of one bistable element is connected to the cathode of the bistable element of the order immediately above via a capacitor ($72_1$ to . . .) and finally, the cathode of each bistable element is coupled via a resistor ($74_1$ to . . .) to the negative terminal of a reference voltage source. The first bistable element is coupled to the output of the shaping device via the series assembly of a resistor 80 and the capacitor 78. It should be noted that this last-mentioned circuit arrangement, as in the case of the parallel-connected circuit, makes it possible to obtain high reliability of operation as a result of the separate polarization of the bistable elements and the sensitization from one diode to another, and the presence of capacitors and inductances makes it possible to provide circuits of the series type and consequently a low tripping power.

What we claim is:

1. A counting device including a scaling unit comprised of a plurality of cascaded bistable elements arranged to be sequentially switched, between a first stable voltage condition and a second stable voltage condition, in response to a train of voltage pulses, pulse shaping means connected to said scaling unit for receiving pulses to be counted and supplying to said scaling unit a train of pulses having the same frequency as said input pulses and including pulse polarity determining means for forming either positive or negative polarity pulses, triggering means actuated by switching of the last bistable element in cascade to cause reversal of the polarity of the voltage pulses supplied by said pulse shaping means whereby continuous application of counting pulses to said scaling unit is effected without a reset operation, and output means connected to said triggering means for indicating a completed cycle of respective polarity of pulses counted by said scaling unit.

2. A counting device as described in claim 1 wherein each said bistable element is a tunnel diode.

3. A counting device as described in claim 1 wherein each bistable element comprises a two terminal circuit including a first branch of a tunnel diode in series with a polarizing voltage source and a second parallel branch of a tunnel diode in series with a polarizing voltage source, said tunnel diodes and said voltage sources being connected in opposition.

4. A counting device as described in claim 1 wherein said pulse shaping means comprises an input transformer having a primary winding and a center tapped secondary winding, one end of said primary winding being connected to an input means and a second end of said primary winding being connected to a point of reference potential, said center tap being coupled to a polarizing voltage source and two ends of said secondary winding each being connected through identical resistors to, respectively, an anode and a cathode of two identical tunnel diodes, the cathode of the first tunnel diode and the anode of the second tunnel diode being commonly connected to said scaling unit.

5. A counting device as described in claim 1 wherein said bistable elements are connected in parallel, a first electrode of each said element being connected to a source of reference potential while a second electrode of each said element is connected through a resistor to a polarizing source, said second electrode of each said element except the last in cascade also being connected through a resistor and an inductor to the second electrode of the following bistable element, the second electrode of each said element being connected through an impedance to an input means of said scaling unit.

6. A counting device as described in claim 1 wherein said triggering means comprises a transistor having a base connected to said scaling unit, a collector connected to said pulse shapinng means, and an emitter connected to a polarizing voltage source.

7. A counting device as described in claim 1 wherein said triggering means comprises a resistor connected between said pulse shaping means and said scalinng unit and further includes transformer means coupling said pulse shaping means and said scaling unit for initiating a reversal of phase in the train of pulses supplied to said scaling unit.

8. A counting device as described in claim 1 wherein the bistable elements of said scaling unit are connected in series and are directly coupled together.

References Cited

UNITED STATES PATENTS

| | | | |
|---|---|---|---|
| 3,121,810 | 2/1964 | Horna | 307—88.5 |
| 3,138,723 | 6/1964 | Goto | 307—88.5 |
| 3,181,005 | 4/1965 | Scarr et al. | 307—88.5 |
| 3,195,019 | 7/1965 | Ulrich | 307—88.5 |
| 3,263,094 | 7/1966 | Balder et al. | 307—88.5 |

JOHN S. HEYMAN, *Primary Examiner.*

ARTHUR GAUSS, *Examiner.*